(12) United States Patent
Peinemann et al.

(10) Patent No.: US 10,960,359 B2
(45) Date of Patent: Mar. 30, 2021

(54) METHOD OF MAKING REACTION INDUCED PHASE SEPARATION MEMBRANES AND USES THEREOF

(71) Applicant: King Abdullah University of Science and Technology, Thuwal (SA)

(72) Inventors: Klaus-Viktor Peinemann, Thuwal (SA); Jamaliah Hani Aburabie, Thuwal (SA); Luis Francisco Villalobos Vazquez de la Parra, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 666 days.

(21) Appl. No.: 15/424,558

(22) Filed: Feb. 3, 2017

(65) Prior Publication Data
US 2017/0225127 A1    Aug. 10, 2017

Related U.S. Application Data

(60) Provisional application No. 62/291,944, filed on Feb. 5, 2016.

(51) Int. Cl.
*B01D 67/00* (2006.01)
*B01D 69/12* (2006.01)
(Continued)

(52) U.S. Cl.
CPC ..... *B01D 67/0013* (2013.01); *B01D 67/0006* (2013.01); *B01D 69/12* (2013.01);
(Continued)

(58) Field of Classification Search
CPC ............... B01D 67/0013; B01D 71/66; B01D 67/0006; B01D 69/12; B01D 71/58; B01D 2323/30; B01D 2325/023
See application file for complete search history.

(56) References Cited

U.S. PATENT DOCUMENTS

| | | | | |
|---|---|---|---|---|
| RE26,065 E | * | 7/1966 | Marvel et al. ......... | C08G 73/18 528/186 |
| 4,020,142 A | * | 4/1977 | Davis ..................... | B01D 71/62 210/500.23 |

(Continued)

OTHER PUBLICATIONS

"High Temperature proton exchange membranes based on polybenzimidazole for fuel cells" by Qingfeng Li, Jens Oluf Jense, Robert F. Savinell, and Niels J Bjerrum Progress in Polymer Science p. 449-477 (2009).*

(Continued)

*Primary Examiner* — Pamela H Weiss
(74) *Attorney, Agent, or Firm* — Patent Portfolio Builders PLLC

(57) ABSTRACT

Provided herein are methods of making asymmetric membranes comprising a first layer and a second layer. The methods include preparing a polymeric solution comprising one or more polymers, casting the polymeric solution to form a polymeric film, contacting the polymeric film with a solvent comprising a crosslinker under conditions to form a first layer on the top of the film, wherein the first layer is dense and solvent resistant, and contacting the polymeric film having the dense, solvent-resistant first layer with a non-solvent solution under conditions that form a porous second layer on the bottom of the film.

46 Claims, 9 Drawing Sheets

(51) Int. Cl.
*B01D 71/58* (2006.01)
*B01D 71/66* (2006.01)

(52) U.S. Cl.
CPC ............ *B01D 71/58* (2013.01); *B01D 71/66* (2013.01); *B01D 2323/30* (2013.01); *B01D 2325/023* (2013.01)

(56) References Cited

U.S. PATENT DOCUMENTS

| | | | | | |
|---|---|---|---|---|---|
| 4,259,183 | A | * | 3/1981 | Cadotte | ............... B01D 69/125 210/500.28 |
| 4,530,703 | A | * | 7/1985 | Malon | ................... B01D 69/08 95/45 |
| 4,826,599 | A | * | 5/1989 | Bikson | ................... B01D 69/08 210/321.8 |
| 4,871,790 | A | | 10/1989 | Lamanna | |
| 4,877,421 | A | * | 10/1989 | Bikson | ............... B01D 67/0083 95/45 |
| 5,725,769 | A | * | 3/1998 | Miller | ................... B01D 71/64 210/490 |
| 7,445,712 | B2 | | 11/2008 | Herron | |
| 8,181,794 | B2 | | 5/2012 | McGinnis | |
| 8,460,554 | B2 | | 6/2013 | McGinnis | |
| 9,156,006 | B2 | | 10/2015 | Yip | |
| 9,463,422 | B2 | | 10/2016 | McGinnis | |
| 2008/0312349 | A1 | | 12/2008 | Yeager | |
| 2013/0105395 | A1 | * | 5/2013 | Jeffrey R. | ............. B01D 69/10 210/654 |

OTHER PUBLICATIONS

"Solvent Resistant Nanofiltration: Separating on a Molecular Level" by Pieter Vandezande, Lieven E M Gevers and Ivo F J Vankelcom Checm Soc. Rev. 37, 365-405 (Jul. 25, 2007).*

Recent Developments in thin film (nano)composite membranes for solvent resistant nanofiltration: Sanne Hermans, Hanne Marien, Cedric Van Goethem, Ivo F J Vankelecom Centre for Surface Chemistry and catalysis Belgium (pp. 1-14)(Mar. 2015).*

"Polybenzimidazole Membranes for Organic Solvent Nanofiltration—Formation Parameters and Applications" by Irina Boyanova Valtcheva Theses Imperial College London Department of Chemical Engineering (2015) 153 pages.*

* cited by examiner

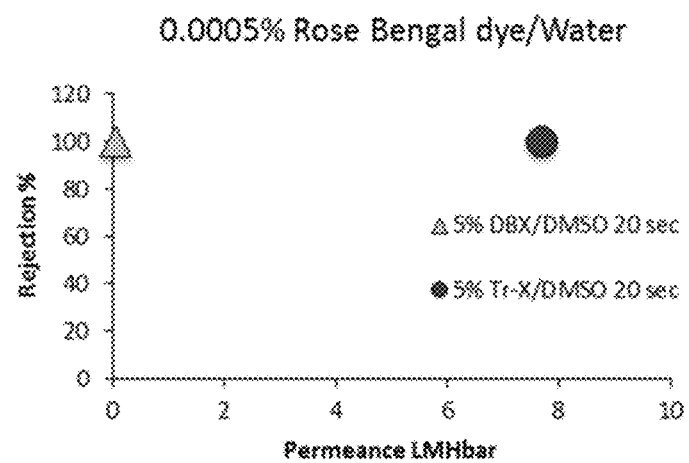
FIG. 11
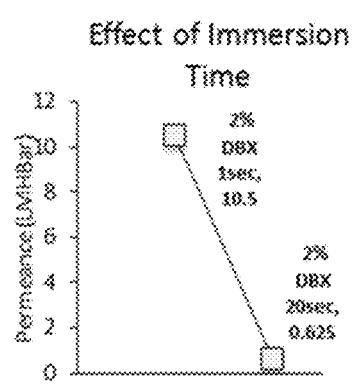 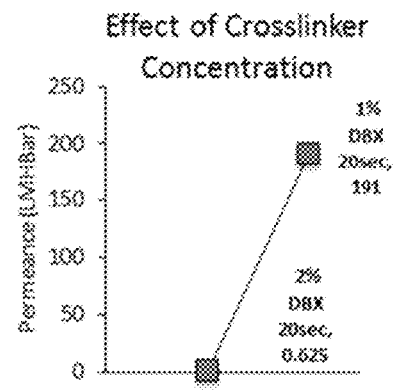 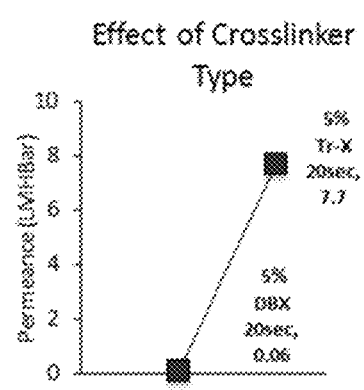
FIG. 12A  FIG. 12B  FIG. 12C

METHOD OF MAKING REACTION INDUCED PHASE SEPARATION MEMBRANES AND USES THEREOF

RELATED APPLICATION DATA

This application claims the benefit of U.S. Provisional Patent Application Ser. No. 62/291,944, filed Feb. 5, 2016.

TECHNICAL FIELD

The present invention relates to a method and system for making reaction induced phase separation membranes and uses thereof.

BACKGROUND OF THE INVENTION

The background of this invention will address Membrane Technology and Polymeric Technology matters.

Membrane Technology

Membranes have been known since the eighteenth century, but membranes were not widely used (outside of the laboratory environment) until after World War II. Drinking water supplies in Europe had been compromised by the war, and membrane filters were used to test for water safety. Membranes used in that time period suffered from a lack of reliability, slow operation, reduced selectivity and elevated costs, and therefore, membranes were not widely exploited until after the 1980s when the first use of membranes on a large scale was accomplished with micro-filtration and ultra-filtration technologies. Since the 1980s, these types of separation processes, along with electrodialysis, have employed membrane technology in large plants and, today, a number of experienced companies serve the membrane market.

Simply put, a membrane is a selective barrier that with a partial permeability—it will allow certain substances to pass through the barrier, but prevent other substances from doing so. A membrane is usually defined by a discrete, thin interface that moderates the permeation of chemical species in contact with it. The substances that can pass through, or be prevented from passing through, the membrane interface may be molecules, ions or other small particles. The influent of an artificial membrane is known as the feed-stream, the liquid that passes through the membrane is known as permeate, and the liquid containing the retained constituents (substances that are prevented from passing through the membrane) is the retentate or concentrate. A normal filter meets this definition of a membrane, but, by convention, the term membrane is usually limited to structures that permeates dissolved or colloidal species, whereas the term filter is used to designate structures that separate larger-sized particulate suspensions.

Membranes can be generally classified into two classes: synthetic membranes and biological membranes. Biological membranes include cell membranes (outer coverings of cells or organelles that allow passage of certain constituents), nuclear membranes, which cover a cell nucleus, and tissue membranes, such as mucosae or serosae. Synthetic membranes are made by humans for use in laboratories or industry, such as chemical plants.

The degree of selectivity of a membrane depends on the membrane pore size. Depending on the pore size, they can be classified as microfiltration (MF), ultrafiltration (UF), nanofiltration (NF) and reverse osmosis (RO) membranes. Membranes can be neutral or charged, and particle transport can be classified as active transport or passive transport. Active transport of permeate can be facilitated by pressure, concentration, chemical or electrical gradients of the membrane process.

Membranes can also be of various thickness, with homogeneous or heterogeneous structures. That is, a membrane interface may be molecularly homogenous, that is, completely uniform in composition and structure, or it may be chemically or physically heterogeneous, for example, containing holes or pores of finite dimensions. Furthermore, the structure of membranes may be symmetric, that is, the structure is identical over the entire cross section of the membrane, or it may be asymmetric, that is, the structure varies over the cross section of the membrane.

Almost all industrial membranes are made from natural (wool, rubber, cellulose) or synthetic polymers. At low temperatures typically below 100° C., idealized polymers can be classified as glassy or crystalline. Glassy type polymers are brittle and glassy in appearance and lacks any crystalline structure, while the crystalline type polymers are brittle, hard, and stiff with a crystalline structure. If the temperature of a glassy polymer is increased, the glass transition temperature (Tg) may be reached where the polymer changes its physical condition and becomes rubbery. If the temperature of a crystalline polymer is increased, the melting temperature (Tm) is reached where the polymer can liquefy and melt. Most polymers have both amorphous and crystalline regions where a certain degree of crystallinity can vary from 5-90%, making it possible for some polymers to have both a Tg and Tm. Membranes made of glassy polymers can operate below or above Tg while membrane of crystalline polymers must operate below Tm.

Synthetic membranes show a large variety in their physical structure and the materials they are made from. Based on their structure they can be classified into four groups: (1) porous membranes, (2) homogeneous solid membranes, (3) solid membranes carrying electrical charges, and (4) liquid or solid films containing selective carriers. The materials used for the preparation of membranes can be polymers, ceramics, glass, metals, or liquids, and the materials may be neutral or carry electrical charges (for example, fixed ions).

Microporous membranes have a porous structure represents a very simple form of a membrane, which closely resembles the conventional fiber filter as far as the mode of separation is concerned. Separation of the various components is achieved strictly by a sieving mechanism with the pore diameter and the particle sizes being the determining parameters.

Porous membranes can be made from various materials like ceramics, graphite, metals, metal oxides, and various polymers. The structure can be symmetric, that is, the pore diameters do not vary over the membrane section, or asymmetric, that is, the pore diameters increase from one side of the membrane to the other, typically by a factor of 10 to 1000. The techniques for the preparation of porous membranes can be rather different and include simple pressing and sintering of polymer or ceramic powders, irradiation and leaching of templates, as well as phase-inversion and polymer precipitation procedures or sol-gel conversion techniques.

A microporous membrane is very similar in its structure and function to a conventional filter. It can have a rigid, highly voided structure with randomly distributed, interconnected pores. However, these pores differ from those in a conventional filter by being extremely small, of the order of 0.01-10 µm in diameter. All particles smaller than the largest pores, but larger than the smallest pores are partially rejected, according to the pore size distribution of the membrane. Particles much smaller than the smallest pores pass through the membrane. Thus, separation of solutes by microporous membranes are mainly a function of molecular size and pore size distribution. Generally, only molecules that differ considerably in size can be separated effectively by microporous membranes like in ultrafiltration and microfiltration.

Nonporous, dense membranes consist of a dense film through which permeants are transported by diffusion under the driving force of a pressure, concentration, or electrical potential gradient. The separation of various components of a solution is related directly to their relative transport rate within the membrane, which is determined by their diffuse rating and solubility in the membrane material. An important property of nonporous, dense membranes is that even permeants of similar size may be separated when their concentration in the membrane material (for example, their solubility) differ significantly. Most gas separation, pervaporation, and reverse osmosis membranes use dense membranes to perform the separation. However, these membranes usually have an asymmetric structure to improve the flux.

Electrically charged membranes can be dense or microporous, but are most commonly microporous with pore walls that carry fixed positively or negatively charged ions. A membrane with positively charged ions is referred to as an anion-exchange membrane because it binds anions in the surrounding fluid. Similarly, a membrane containing negatively charged ions is called a cation-exchange membrane. In a cation-exchange membrane, the fixed anions are in electrical equilibrium with mobile cations in the interstices of the polymer. On the contrary, the mobile anions are more or less completely excluded from the cation-exchange membrane because of their electrical charge, which is identical to that of the fixed ions.

Membrane separation with a charged membrane interface is achieved primarily by exclusion of ions of the same charge as the fixed ions of the membrane structure, and to a much lesser extent by the pore size. Due to the exclusion of the anions, a cation exchange membrane permits transfer of cations only. Anion exchanger membranes carry positive charges fixed on the polymer matrix. Therefore, they exclude all cations and are permeable only to anions.

Films carrying charged groups are referred to as ion-exchange membranes, and they consist of highly swollen gels carrying fixed positive or negative charges. The properties and preparation procedures of ion-exchange membrane are closely related to those of ion exchange resins. The charged membrane separation is affected by the charge and concentration of the ions in solution. For an example, monovalent ions are excluded less effectively than divalent ions; and, in solutions of high ionic strength, selectivity of the separation decreases.

Although there are a number of inorganic ion exchange materials, mostly based on zolites and bentonites, these materials are rather unimportant in ion exchange membranes compare to polymer materials. Electrically charged membranes are used for processing electrolyte solutions in electrodialysis, and they are also used as ion-conducting separators in batteries and fuel cells.

Asymmetric membranes are membranes where the transport rate of a species through a membrane is inversely proportional to the membrane thickness. High transport rates are desirable in membrane separation processes for economic reasons, so it is usually desirable for a membrane to be constructed as thin as possible. Conventional film fabrication technology limits manufacture of mechanically strong films to about 20 μm thickness. The development of novel membrane fabrication techniques to produce asymmetric membrane structures was one of the breakthroughs of membrane technology during the past 30 years.

Asymmetric membranes can also be constructed with an extremely thin surface layer supported on a much thicker porous, dense substructure. The surface layer and its substructure may be formed in a single operation or formed separately. The separation properties and permeation rates of the membrane are determined exclusively by the surface layer, the substructure functions as a mechanical support. One advantage of such asymmetric membranes are the higher fluxes provided by them, which can be so great that almost all commercial processes use such membranes.

In a symmetric membrane, the structure and the transport properties are identical over the entire cross section, and the thickness of the entire membrane determines the flux. In asymmetric membranes structural and transport properties vary over the membrane cross-section. An asymmetric membrane consists of a 0.1-1 μm thick 'skin' layer on a highly porous 100-200 μm thick substructure. The skin layer represents the actual selective barrier of the asymmetric membrane, and its separation characteristics are determined by the nature of the material or the size of its pores. The mass flux of this kind of membrane is determined mainly by the skin thickness, and the porous sublayer serves only as a support for the mostly thin and fragile skin and has little effect on the separation characteristics or the mass transfer rate of the membrane.

Asymmetric membranes are used primarily in pressure-driven membrane processes such as reverse osmosis, ultrafiltration, and gas and vapor separation, because such uses are supported by the unique properties of asymmetric membranes—high flux rates and good mechanical stability. Two exemplary techniques used to prepare asymmetric membranes include: (1) a phase-inversion process, which produces a skin layer and the support structure made from the same material in a single process, and (2) a two-step deposition process that produces a composite structure having a thin barrier layer deposited on a porous substructure, where the barrier and support structures are generally made of different materials.

There are several historical limitations involved with the application, use and manufacture of known membrane processes. A major disadvantage involved with the use of known membranes, especially in water- and wastewater-treatment processes, is that the long-term reliability has not completely been proven. Membrane processes sometimes require excessive pretreatment due to their sensitivity to concentration polarization, chemical interaction with water constituents, and membrane fouling. And, membranes have historically be mechanically unreliable and non-robust, which means membranes can easily be destroyed by a malfunction in the operating procedure.

Depending on the composition of the feed solution and the required quality of the product water, a combination of membrane or filtration processes may be appropriate. For example, if ultrapure water for certain industrial applications is required, a sequence of membrane filtration processes may be applied, such as reverse osmosis, ion exchanger, UV sterilization, and microfiltration as a point-of-use filter to remove traces of particles. In certain applications, such as the purification of industrial effluents and wastewaters or the desalination of brackish water, there may be a problem with the disposal of the concentrate. In these applications, brine post-treatment procedures may need to be applied to the concentrate.

Membranes produced by prior art manufacturing procedures also suffer generally from the disadvantages of a lack of reliability, slow manufacturing cycles, reduced selectivity and elevated costs. Membrane processes can be energy efficient, but energy consumption is only part of the total process costs. Other factors determining the overall economics of a membrane-related process include the investment-related costs, which are determined by the cost of the membrane manufacturing, cost of manufacturing equipment, cost of other process equipment, and the useful life of the membrane under operating conditions.

Polymeric Technology

While there are ceramic, metal and liquid membranes, the vast majority of membranes used commercially are polymer-based. A polymer (Greek poly, "many"; -mer, "parts") is a large molecule or macromolecule composed of many repeated subunits. Because of their broad range of properties, both synthetic and natural polymers play an essential and ubiquitous role in everyday life. Polymers range from familiar synthetic plastics such as polystyrene to natural biopolymers such as DNA and proteins, which are fundamental to biological structure and function.

Polymers are studied in the fields of biophysics and macromolecular science, and polymer science (which includes polymer chemistry and polymer physics). Polymers, both natural and synthetic, are created via polymerization of many small molecules, known as monomer. Their consequently large molecular mass relative to small molecule compounds produces unique physical properties, including toughness, viscoelasticity, and a tendency to form glasses or semi-crystalline structures rather than crystals. The units composing polymers derive, actually or conceptually, from molecules of low relative molecular mass.

Phase inversion is a process where a polymer in liquid form (solution) is transformed in a controlled manner into a solid state. Phase inversion is a chemical phenomenon exploited in the fabrication of artificial membranes, and one way of conducting a phase inversion is to remove a solvent from a liquid-polymer solution, leaving a porous, solid membrane. Phase inversion is a common method to form filtration membranes, which are typically formed using artificial polymers. The method of phase inversion is highly dependent on the type of polymer used and the solvent used to dissolve the polymer.

Phase inversion can be carried out through one of four typical methods: (1) reducing the temperature of the solution; (2) immersing the polymer solution into anti-solvent; (3) exposing the polymer solution to a vapor of anti-solvent, or (4) evaporating the solvent in atmospheric air or at high temperature. The rate at which phase inversion occurs and the characteristics of the resulting membrane are dependent on several factors, including: (1) solubility of solvent in the anti-solvent; (2) insolubility of the polymer in the anti-solvent; and, (3) temperature of the anti-solvent.

Phase inversion membranes are typically characterized according pore size and pore distribution. These factors can be measured using evaporometry, where the membrane is immersed and measured for change in mass due to evaporation of the 2-propanol. The rate of evaporation of 2-propanol from the pores of the membrane can be used to calculate the pore size using the Kelvin equation. A scanning electron microscope (SEM) can also be used to characterize membranes with larger pore sizes, such as microfiltration and ultrafiltration membranes, while transmission electron microscopy (TEM) can be used to characterize all membrane types, including small pore membranes such as nanofiltration and reverse osmosis.

Apart from phase inversion, other methods for fabricating composite membranes include interfacial polymerization, dip coating and spin coating. These methods are more complex than the phase inversion methods because they require fabrication of the support and the dense layer in different steps. Moreover, if crosslinking is desired to make the membrane more robust, an extra step is needed in these other methods.

Immersion precipitation can also be performed in which a polymer solution consisting of a polymer and a solvent is cast to the desired thickness as a thin film and the film is subsequently immersed in a coagulation bath containing non-solvent. This method is referred to as non-solvent induced phase separation (NsIPS). The morphology of the resulting membrane depends on the diffusion between solvent and non-solvent. The solvent diffuses into the non-solvent bath whereas the non-solvent diffuses into the casted film. After a given period of time, the casted film becomes thermodynamically unstable and the phase separate. Finally, a solid polymeric film is obtained with asymmetric structure.

If the rate of diffusion between the solvent and non-solvent is fast, a porous membrane (microfiltration/ultrafiltration) can be obtained due to the fast precipitation where the polymer chains immediately precipitate after non-solvent exposure. However, if the rate of diffusion is slow the polymer chains take time to precipitate, which results in a more dense (gas separation/pervaporation) membrane due to the delayed precipitation. Commercially available polymeric membranes are prepared by unpredictable method.

Known polymer techniques used to produce membranes continue to suffer generally from the disadvantages of a lack of reliability, slow manufacturing cycles, reduced selectivity and elevated costs. Prior phase inversion and immersion precipitation methods used to make polymeric membranes have not be cost effective and produce reliable membranes at an economical feasible cost. Such known methods suffer from elevated costs of the membrane manufacturing process, the manufacturing equipment, and the other process equipment, as well suffer from lower than expected durability, reliability, and useful life of the membrane under operating conditions.

SUMMARY OF THE INVENTION

The present invention is a method of fabricating composite membranes with a cross-linked dense layer, as well as the resulting membrane itself. The present method provides an approach for the fabrication of membranes with a new set of properties, and the present invention produces a new composite membrane from a unique phase inversion process. The present invention manufacturing method uses the advantages of composite membrane production, i.e., independent optimization of the support layer and the dense layer, with a more efficient use of expensive materials, such as cross linkers.

A cross-link is a bond that links one polymer chain to another, where the bonds can be covalent bonds or ionic bonds. When the term "cross-linking" is used in the synthetic polymer science field, it usually refers to the use of cross-links to promote a difference in the polymers' physical properties. The extent of crosslinking and specificities of the crosslinking agents can vary, but generally, when cross links are added to long polymeric molecules, the flexibility decreases, the hardness increases and the melting point increases as well. When polymer chains are linked together by cross-links, they lose some of their ability to move as individual polymer chains. In polymer chemistry, when a synthetic polymer is said to be "cross-linked", it usually means that the entire bulk of the polymer has been exposed to the cross-linking method. The resulting modification of mechanical properties depends strongly on the cross-link density.

Provided herein are methods of making asymmetric membranes comprising a first layer and a second layer. The methods include preparing a polymeric solution comprising one or more polymers, casting the polymeric solution to form a polymeric film, contacting the polymeric film with a solvent comprising a crosslinker under conditions to form a first layer on the top of the film, wherein the first layer is dense and solvent resistant, and contacting the polymeric film having the dense, solvent-resistant first layer with a non-solvent solution under conditions that form a porous second layer on the bottom of the film.

The asymmetric membrane comprises a first layer and a second layer, where the first layer is the top layer and the second layer is the bottom layer. Further, the first layer is 10 nm to 10 µm in thickness, or any thickness between 10 nm to 10 µm inclusive. The second layer may be 10-500 µm in thickness.

In the provided methods, the polymeric solution can be prepared by a condensation reaction of monomers in a solvent. The solvent can be used in the polymeric solution is the same solvent used to contact the polymeric film, or the solvents may be different. Suitable solvents for use in the provided methods include, but are not limited to, dimethyl sulfoxide (DMSO) or Dimethylacetamide (DMAc) or Dimethylformamide (DMF) or Tetrahydrofuran (THF) or N-methyl-2-pyrrolidone (NMP).

The membranes produced by these processes comprise a first layer and a second layer, where the first layer is the top layer and the second layer is the bottom layer. The first layer may be dense and solvent resistant, and the second layer may be a porous second layer on the bottom of the film. The first layer of the asymmetric membrane may comprise predominantly crosslinked polymeric chains, and the second layer of the asymmetric membrane comprises predominantly uncrosslinked polymeric chains.

Preferably, the first layer is 10 nm to 10 µm in thickness, or any thickness between 10 nm to 10 µm inclusive. The second layer may be 10-500 µm in thickness. The membranes can include, for example, polythiosemicarbazide polymer (PTSC) or polybenzimidazole polymer (PBI). The membranes can comprise one or more polymers with piperazine groups in the backbone or side chains like polythiosemicarbazide polymer (PTSC). Alternatively, the membranes can comprise one or more polymers with imidazole groups in the backbone or side chains like polybenzimidazole polymer (PBI).

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which:

FIG. 11 is a graph showing flux enhancement with changing crosslinker types without compromising rejection, and, FIGS. 12A, 12B and 12C are graphs showing the effect of different parameters on the water flux through RIPS membranes.

Figure 1:
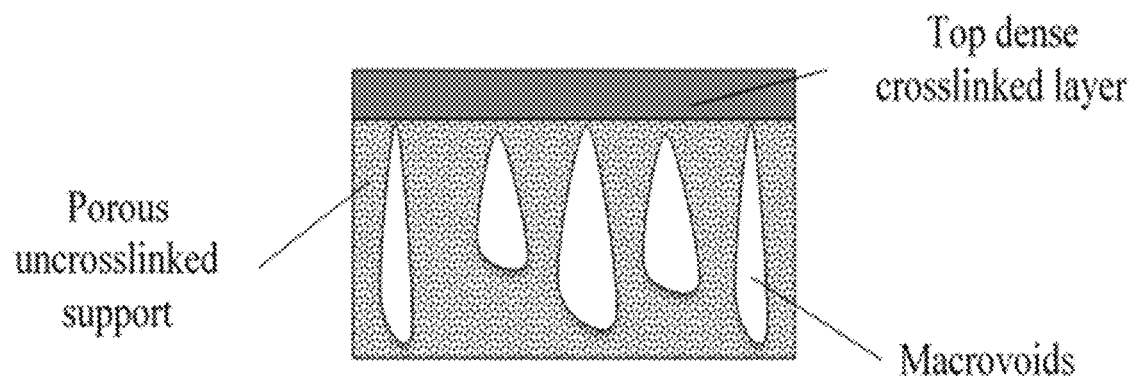
FIG. 1 is a simplified representation of the membrane prepared by the provided methods.

While the invention is susceptible to various modifications and alternative forms, specific embodiments thereof have been shown by way of example in the drawings and are herein described in detail. It should be understood that the description herein of specific embodiments is not intended to limit the invention to the particular forms disclosed, but on the contrary, the intention is meant to cover all modifications, equivalents, and alternatives falling within the spirit and scope of the invention as defined by the appended claims.

DETAILED DESCRIPTION

As described herein, the present invention is a Reaction Induced Phase Separation (RIPS) method of immersion precipitation in which a casted polymeric film is first immersed in a solvent bath with the addition of crosslinking agent for a period of time and then transferred to a non-solvent bath. The first step is responsible for forming a dense selective layer, whereas the second step is responsible for forming a porous support layer. The addition of a crosslinking agent allows phase separation of the casted polymeric film to occur in the same solvent used to prepare the polymer solution.

The present invention is a method of fabricating composite membranes with a cross-linked dense layer, as well as the resulting membrane itself. The present method provides an approach for the fabrication of membranes with a new set of properties, and the present invention produces a new composite membrane from a unique phase inversion process. The present invention manufacturing method uses the advantages of composite membrane production, i.e., independent optimization of the support layer and the dense layer, with a more efficient use of expensive materials, such as cross linkers.

A cross-link is a bond that links one polymer chain to another, where the bonds can be covalent bonds or ionic bonds. When the term "cross-linking" is used in the synthetic polymer science field, it usually refers to the use of cross-links to promote a difference in the polymers' physical properties. The extent of crosslinking and specificities of the crosslinking agents can vary, but generally, when cross links are added to long polymeric molecules, the flexibility decreases, the hardness increases and the melting point increases as well. When polymer chains are linked together by cross-links, they lose some of their ability to move as individual polymer chains. In polymer chemistry, when a synthetic polymer is said to be "cross-linked", it usually means that the entire bulk of the polymer has been exposed to the cross-linking method. The resulting modification of mechanical properties depends strongly on the cross-link density.

This crosslinking reaction transforms the top layer of the polymer film into a solvent-resistant dense layer that will not dissolve. It is important to promote a fast crosslinking reaction that forms a more resistant polymeric matrix; otherwise the polymeric film will completely dissolve before sufficient crosslinks are formed for phase separation. Thus, a polymer with functional groups that can be crosslinked very fast (optionally, within seconds), preferably at room temperature, is used. Optionally, a crosslinker that is soluble in the same solvent as the polymer solution or any solvent that dissolves the polymer is used in order to assure that phase separation in the first bath is promoted by the cross-linking reaction and not by the non-solvent exposure in the second bath.

The provided methods can be used for fabricating membranes for various applications such as gas separation, water purification, and solvent resistant nanofiltration, among others. The advantages over current membrane-manufacture technologies include the fabrication of a dense layer and a porous support in different steps allowing optimization of each layer without compromising the structure of the other. In contrast, using the most common membrane manufacturing method, phase inversion, the conditions affect both the dense layer and the porous support so full optimization of both layers is impossible. Further, the methods in current industrial facilities can be modified to implement fabrication of membranes via phase inversion. Implementation of the provided methods by current membrane manufacture companies would be economical and would not require a large investment.

Fabrication of membranes with a dense layer made of covalently crosslinked polymer chains makes the membrane very robust. Thus, the membrane made by the presently disclosed method can withstand harsher environments and solvents that normally dissolve the polymer when the cross-links are not present. Finally, specific functionalities can be precisely incorporated into the dense layer by including them in the crosslinker used. This reduces the cost of membrane manufacture because the added functionality can be concentrated into only the active top dense layer, where it is needed, and not over the entire membrane.

Provided herein are methods of making asymmetric membranes comprising a first layer and a second layer. The methods include preparing a polymeric solution comprising one or more polymers, casting the polymeric solution to form a polymeric film, contacting the polymeric film with a solvent comprising a crosslinker under conditions to form a first layer on the top of the film, wherein the first layer is dense and solvent resistant, and contacting the polymeric film having the dense, solvent-resistant first layer with a non-solvent solution under conditions that form a porous second layer on the bottom of the film.

The asymmetric membrane comprises a first layer and a second layer, where the first layer is the top layer and the second layer is the bottom layer. Further, the first layer is 10 nm to 10 µm in thickness, or any thickness between 10 nm to 10 µm inclusive. The second layer may be 10-500 µm in thickness.

In the provided methods, the polymeric solution can be prepared by a condensation reaction of monomers in a solvent. The solvent can be used in the polymeric solution is the same solvent used to contact the polymeric film, or the solvents may be different. Suitable solvents for use in the provided methods include, but are not limited to, dimethyl sulfoxide (DMSO) or Dimethylacetamide (DMAc) or Dimethylformamide (DMF) or Tetrahydrofuran (THF) or N-methyl-2-pyrrolidone (NMP).

The membranes produced by these processes comprise a first layer and a second layer, where the first layer is the top layer and the second layer is the bottom layer. The first layer may be dense and solvent resistant, and the second layer may be a porous second layer on the bottom of the film. The first layer of the asymmetric membrane may comprise predominantly crosslinked polymeric chains, and the second layer of the asymmetric membrane comprises predominantly uncrosslinked polymeric chains.

Preferably, the first layer is 10 nm to 10 µm in thickness, or any thickness between 10 nm to 10 µm inclusive. The membranes can include, for example, polythiosemicarbazide polymer (PTSC) or polybenzimidazole polymer (PBI). The membranes may also comprise one or more polymers with piperazine groups in the backbone or side chains like polythiosemicarbazide polymer (PTSC). Alternatively, the membranes can comprise one or more polymers with imidazole groups in the backbone or side chains like polybenzimidazole polymer (PBI).

The membranes made by the provided methods have two distinctive layers, a top layer and a bottom layer with different morphologies, but consisting of the same polymeric material. As seen in FIG. 1, the top dense crosslinked layer is composed of chemically crosslinked polymer chains that form a dense thin film layer, whereas the porous uncrosslinked support bottom layer consists of a porous structure formed by non-crosslinked polymer chains. Within the porous uncrosslinked support layer are macrovoids, which are teardrop-shaped spaces that form in the porous support layer during casting of the polymeric membrane.

The top dense crosslinked layer is formed by exposing a viscous polymer solution film to an effective solvent for the polymer containing small amounts of a compound that can crosslink the polymer chains. In a completely unexpected and synergistic result, immediately or in a very brief period of time after contact, a solid film forms at the surface of the viscous polymer solution. This newly formed solid layer made of crosslinked polymer chains is insoluble due to the high degree of crosslinking between the polymer chains. Then, the solid film on top of the viscous polymer solution is immersed in a non-solvent bath. In this step the common phase inversion process of the remaining viscous polymer solution beneath the solid dense layer forms the porous support.

One of the advantages of this method is that the thickness of the dense layer can be easily controlled. Changing the immersion time and the concentration of the crosslinker can lead to an increase or decrease in the thickness. For example, a longer immersion time and/or a higher concentration of crosslinker results in a thicker dense layer. The thickness of the dense layer can be controlled over several orders of magnitude, from less than 100 nm to a few micrometers. Further, targeted functional groups present in the bifunctional crosslinker can be incorporated in only the dense layer, avoiding their presence in the porous support layer.

Figure 2:
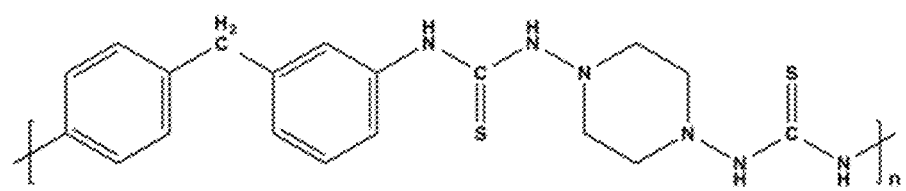
FIG. 2 is a schematic of the chemical structure of polythiosemicarbazide polymer (PTSC)
Figure 3:
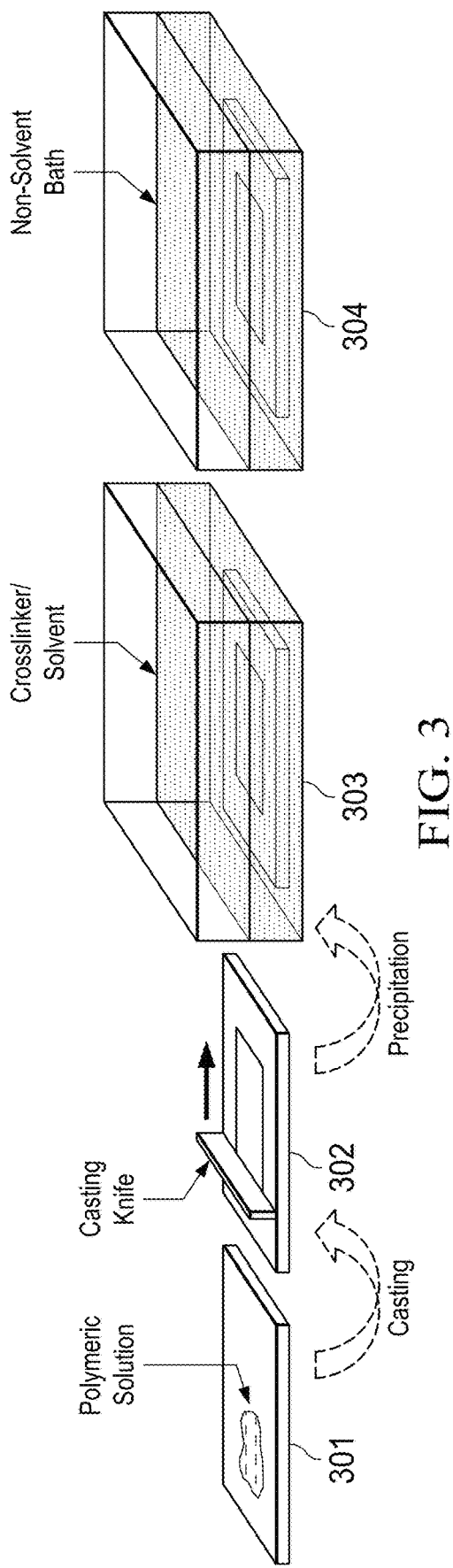
FIG. 3 is a schematic showing the steps for the herein provided method.

FIG. 2 is an example structure of polythiosemicarbazide polymer (PTSC), which is one of the polymers suitable for the disclosed method, and FIG. 3 depicts the general steps in the disclosed method. There are three general steps of the RIPS method depicted in FIG. 3. The first step involves casting of a thin film with the polymer solution (301, 302). The second step involves immersing the polymer film in a bath (303) of having an effective solvent for the polymer containing a certain concentration of crosslinker. The third step involves placing the resulting film in a non-solvent bath (304).

In the first step, the membranes are prepared using a polymeric solution having one or more polymer and one or more solvent as the casting solution. The general casting process consists of applying the polymer solution to a membrane-casting plate (301) and spreading the solution with a membrane casting knife into a thin film having the desired thickness (302).

During the second step, the polymeric film is contacted with a solvent comprising a crosslinker. The polymeric film cast in step 1 is immersed in a bath having an effective solvent for the polymer containing a concentration of crosslinker 303). The polymer chains on the top layer of the viscous polymer solution film form an insoluble crosslinked matrix. This matrix gives rise to a solvent-resistant dense layer that floats over the viscous polymer solution film. This dense layer acts as a barrier delaying the diffusion of the crosslinker to the polymer solution beneath the dense layer, allowing control over the dense layer thickness by varying the immersion time.

The immersion time and the concentration of the crosslinker are important for determining the thickness of the dense layer. A longer immersion time and higher concentration of the crosslinker will typically yield a thicker top layer. By carefully controlling the immersion time and the crosslinker concentration, the top layer thickness can be optimized. Moreover, by changing the type of crosslinker, different functional groups can be incorporated in the dense layer.

In the third step, the polymeric film from step 2 is placed in a non-solvent solution bath (304) under conditions that form a porous non-crosslinked second layer on the bottom of the film. The remaining polymer solution below the dense top layer is precipitated by non-solvent exchange to form a porous support. The time used in the non-solvent precipitation step will vary depending on the rate of diffusion of the crosslinker to the polymer solution that forms the second layer. Contacting with the non-solvent can vary from 30 minutes to 24 hours.

Provided herein are methods of making an asymmetric membrane comprising a first layer and a second layer. An exemplary method includes preparing a polymeric solution comprising one or more polymers, casting the polymeric solution to form a polymeric film, contacting the polymeric film with a solvent comprising a crosslinker under conditions to form a first layer on top of the film, wherein the first layer is dense and solvent resistant, and contacting the polymeric film having the dense, solvent-resistant first layer with a non-solvent solution under conditions that form a porous second layer on the bottom of the film.

In the provided methods, the polymeric solution is cast into a polymeric film of a desired thickness. Optionally, the thickness of the polymeric film is 500 microns or less. Optionally, the polymeric film is 10 microns to 500 microns in thickness. Optionally, the polymeric film is 10, 20, 30, 40, 45, 50, 55, 60, 65, 70, 75, 80, 85, 90, 95, 100, 125, 150, 175, 200, 225, 250, 275, 300, 325, 350, 375, 400, 425, 450, 475, or 500 microns in thickness or any range between 10 to 500 microns in thickness.

Suitable polymers for use in the provided methods include, but are not limited to polythiosemicarbazide polymer (PTSC) (shown in FIG. 2) or polybenzimidazole polymer (PBI). Optionally, the one or more polymers comprise polythiosemicarbazide polymer (PTSC), polybenzimidazole polymer (PBI), or combinations thereof. Optionally, the one or more polymers comprise one or more functional groups, wherein one or more of the functional groups crosslink within one minute or less in the presence of the solvent comprising the crosslinker to form the first layer. Optionally, the one or more polymers comprise piperazine group in the backbone or side chains like polythiosemicarbazide polymer (PTSC). Optionally, the one or more polymers comprise imidazole groups in the backbone or side chains like polybenzimidazole polymer (PBI). Optionally, the polymeric solution comprises 1 to 35 (weight/weight) % polymer. Optionally, the polymeric solution comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35, (weight/weight) % of the polymer or any value between 1% and 35% (weight/weight) % of the polymer, inclusive.

The asymmetric membrane comprises a first layer and a second layer. The first layer is the top layer and the second layer is the bottom layer. The first layer is 10 nm to 10 µm in thickness, or any thickness between 10 nm to 10 µm, inclusive. The second layer may be 10-500 µm in thickness. The first layer of the asymmetric membrane may comprise predominantly crosslinked polymeric chains. The second layer of the asymmetric membrane may also comprises predominantly uncrosslinked polymeric chains.

In the provided methods, the polymeric solution can be prepared by a condensation reaction of monomers in a solvent. The solvent used in the polymeric solution is the same solvent used to contact the polymeric film. Alternatively, the solvents may be different. Suitable solvents for use in the provided methods include, but are not limited to, dimethyl sulfoxide (DMSO), Dimethylacetamide (DMAc), Dimethylformamide (DMF), Tetrahydrofuran (THF), N-methyl-2-pyrrolidone (NMP), or any combination thereof.

As noted above, the polymeric film can be contacted with a solvent comprising a crosslinker under conditions to form a first layer on the top of the film, wherein the first layer is dense and solvent resistant. Optionally, the contacting comprises immersion for less than 300 seconds in the solvent comprising the crosslinker. Optionally, the contacting occurs between 0.1 seconds to 300 seconds, inclusive, in the solvent comprising the crosslinker. The contacting can be any time between and including 0.1 and 300 seconds, inclusive of all intervening times. Optionally, the contacting occurs for 0.1, 0.5, 1, 2, 3, 4, 5, 6, 7, 8, 9, 10, 20, 30, 40, 50, 60, 70, 80, 90, 100, 125, 150, 175, 200, 225, 250, 275, or 300 seconds. Optionally, the solvent comprising the crosslinker comprises 0.1 to 10% weight/weight of the crosslinker. Optionally, the solvent comprising the crosslinker comprises 0.1, 0.2, 0.3, 0.4, 0.5, 0.6, 0.7, 0.8, 0.9, 1, 2, 3, 4, 5, 6, 7, 8, 9, or 10% weight/weight of the crosslinker or any value between 0.1% and 10% weight/weight, inclusive.

Optionally, the polymer film may undergo sonication for a portion of the immersion time or all of the immersion time in the solvent bath. Optionally, the polymer film may undergo sonication for a portion of the immersion time or all of the immersion time in the non-solvent bath. Optionally, the sonication time is one hour.

Suitable crosslinkers for use in the provided methods include, but are not limited to, bifunctional alkyl halides, multifunctional alkyl halides, bifunctional isocyanates, multifunctional isocyanates, bifunctional acyl chlorides, multifunctional acyl chlorides, or any combinations thereof. Optionally, the crosslinker is a crosslinker of the formula X—R—Y. X can be the same as or different than Y. Optionally, X or Y is I, Br, Cl, F, CN, COCl, $C_6H_4SO_3H$, or an epoxy group. Optionally, R is an aliphatic or aromatic moiety. Optionally, the crosslinker is 1,4-dibromo-p-xylene (DBX), 2,3,6,7,14,15-hexakis (bromomethyl)-9,10-dihydro-9,10-[1',2'] benzenoanthracene (Tr-X), or any combination thereof.

As noted above, the method includes contacting the polymeric film having the dense, solvent-resistant first layer with a non-solvent solution under conditions that form a porous second layer on the bottom of the film. The contacting step may comprises a precipitation by non-solvent exchange to form the porous second layer. The non-solvent solution may be water. The contacting step with the non-solvent solution may transpire over 1 to 12 hours. Optionally, the contacting with the non-solvent solution comprises 30 minutes to 24 hours.

Also provided herein are membranes made by the provided methods. The membranes comprise a first layer and a second layer. Optionally, the first layer is the top layer and the second layer is the bottom layer. Optionally, the first layer is dense and solvent resistant. Optionally, the second layer is a porous second layer on the bottom of the film. Optionally, the first layer of the asymmetric membrane comprises predominantly crosslinked polymeric chains. Optionally, the second layer of the asymmetric membrane comprises predominantly uncrosslinked polymeric chains. Optionally, the first layer is 10 nm to 10 µm in thickness, or any thickness between 10 nm to 10 µm inclusive. The membranes can include, for example, polythiosemicarbazide polymer (PTSC) or polybenzimidazole polymer (PBI). Optionally, the membranes comprise one or more polymers with piperazine groups in the backbone or side chains like polythiosemicarbazide polymer (PTSC). Optionally, the membranes comprise one or more polymers with imidazole groups in the backbone or side chains like polybenzimidazole polymer (PBI).

EXAMPLES

Preparation of membranes via RIPS with different top layer thickness due to the change in crosslinker concentration and immersion time are described. The membranes were prepared using a polymeric solution of 15 weight/weight % PTSC in DMSO as the casting solution. The structure of the PTSC polymer is illustrated in FIG. 2. This polymer can be easily crosslinked by using bifunctional alkyl halide crosslinkers (at room temperature, and within seconds) through the very active piperazine groups present in its backbone. This polymer was prepared by a condensation reaction of equimolar quantities of its respective monomers in dimethyl sulfoxide (DMSO) at 60° C. for two days, followed by precipitation in hot water for two days and a drying step in the oven at 60° C. for another two days. The monomers are bis(4-isothiocyanatophenyl) methane and 1,4-diaminopiperazine.

Example 1. Reaction Induced Phase Separation (RIPS) with DBX Crosslinker

Figure 4:
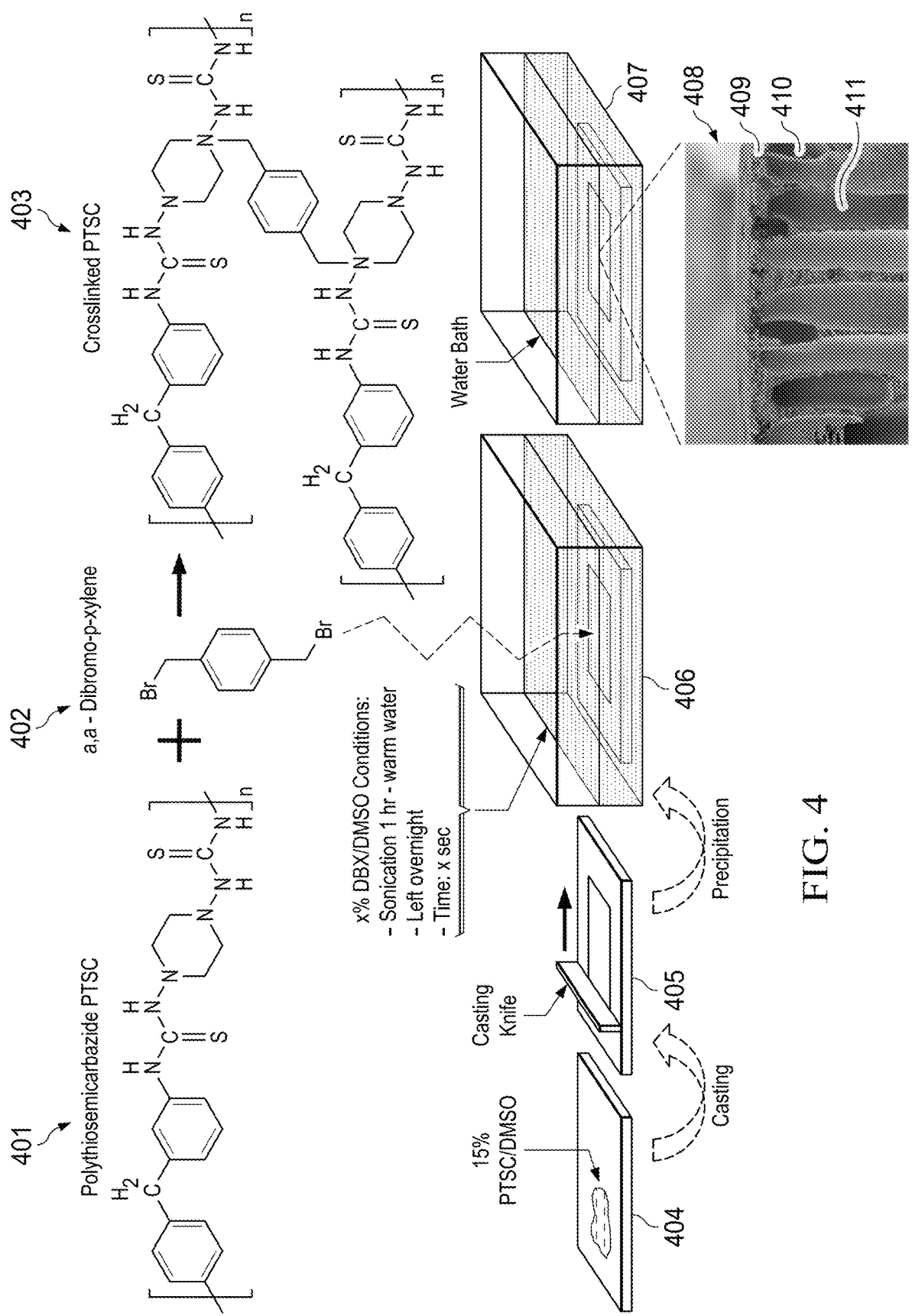
FIG. 4 is a schematic of the herein provided method for Example 1.

FIG. 4 is a schematic of RIPS fabrication of membranes using Dibromo-p-xylene (DBX) (402) as crosslinker. In the chemical reaction schematic at the top of Example 1, the PTSC polymer (401) is crosslinked by DBX (402) to form a film of crosslinked PTSC polymer (403). The membranes were prepared using a polymeric solution of 15 wt % PTSC in DMSO as the casting solution. The resulting polymer solution was viscous and yellow in color. To eliminate any air bubbles in the solution, a two-hour settling time was allowed, avoiding possible imperfections on the membrane.

The general preparation process consisted of casting a 250 µm thick polymer film with a membrane casting knife by applying the polymer solution to a casting plate (404) and using a casting knife to spread the solution into a thin film (405). Following the casting step, the polymer film is immersed (406) in a solution of Dibromo-p-xylene (DBX) in DMSO to form the top dense layer. Finally, the polymeric film was transferred to a water (non-solvent) bath (407) to precipitate the porous support layer. The SEC image (408) shows the structure of the membrane at the end the of the non-solvent precipitation step (407) with the dense crosslinked top layer (409), the porous non-crosslinked support layer (410), and the macrovoids (411) having been formed in the membrane.

Figure 5:
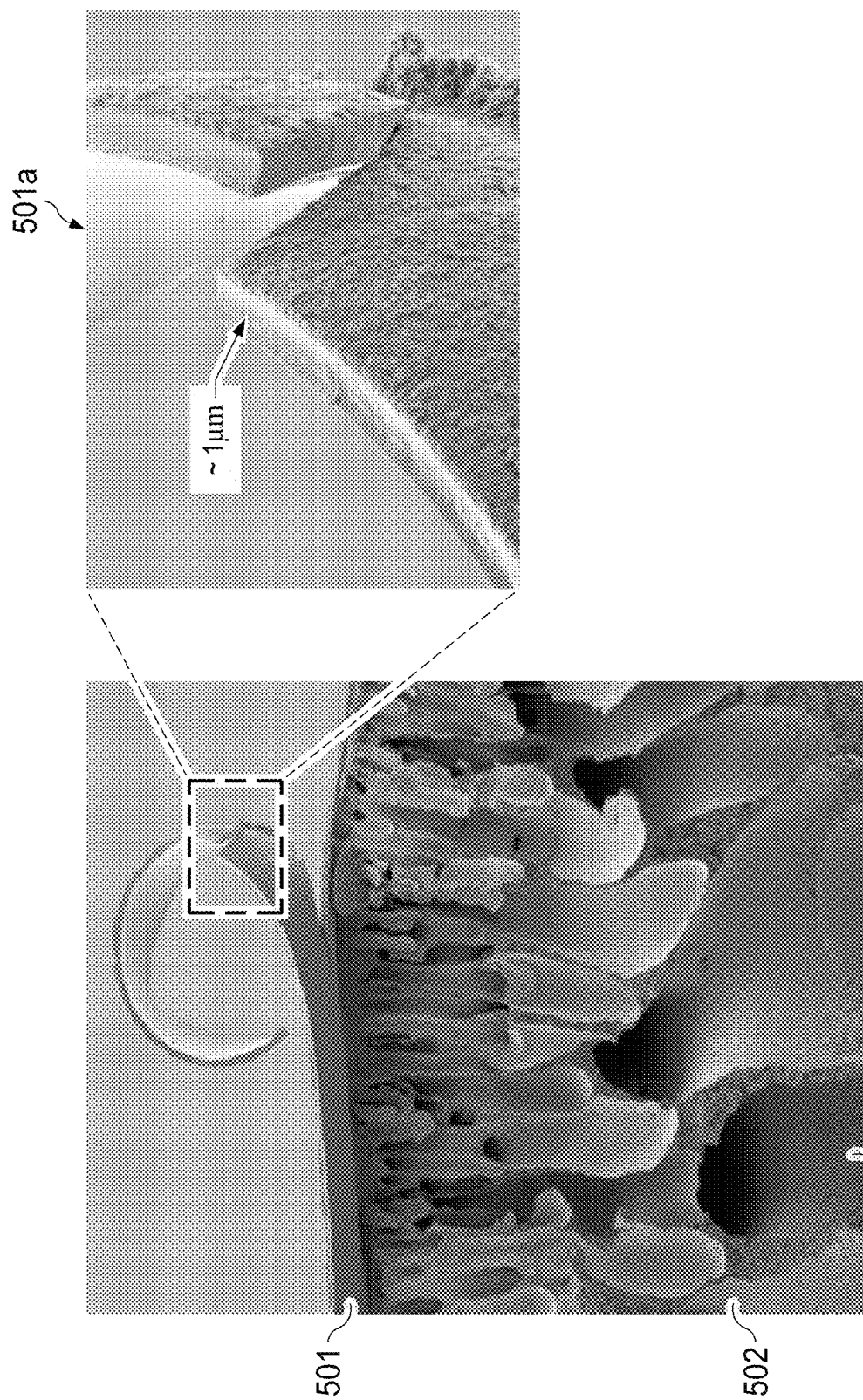
FIG. 5 is a scanning electron micrographic (SEM) image of a membrane cross-section of 15% PTSC/DMSO precipitated in 10% DBX/DMSO for 20 seconds.

Differing concentrations of the DBX crosslinker were used along with variable immersion times to produce membranes having different thicknesses in the dense top layer with varying degrees of porosity in the porous non-crosslinked support layer. FIG. 5 shows SEM images of membranes obtained with a 15% PTSC/DMSO polymeric film precipitated in a 10% DBX/DMSO crosslinker/solvent immersion bath for 20 seconds and then precipitated in a non-solvent water immersion bath for the last step. The dense crosslinked top layer (501), as seen in FIG. 5, is a thin layer floating over the porous non-crosslinked support layer (502). Macrovoids (503) formed in the support layer are also visible throughout the porous layer. The enlargement (501a) shows the dense top layer to have a thickness of approximately 1 µm under these conditions.

Figure 6:
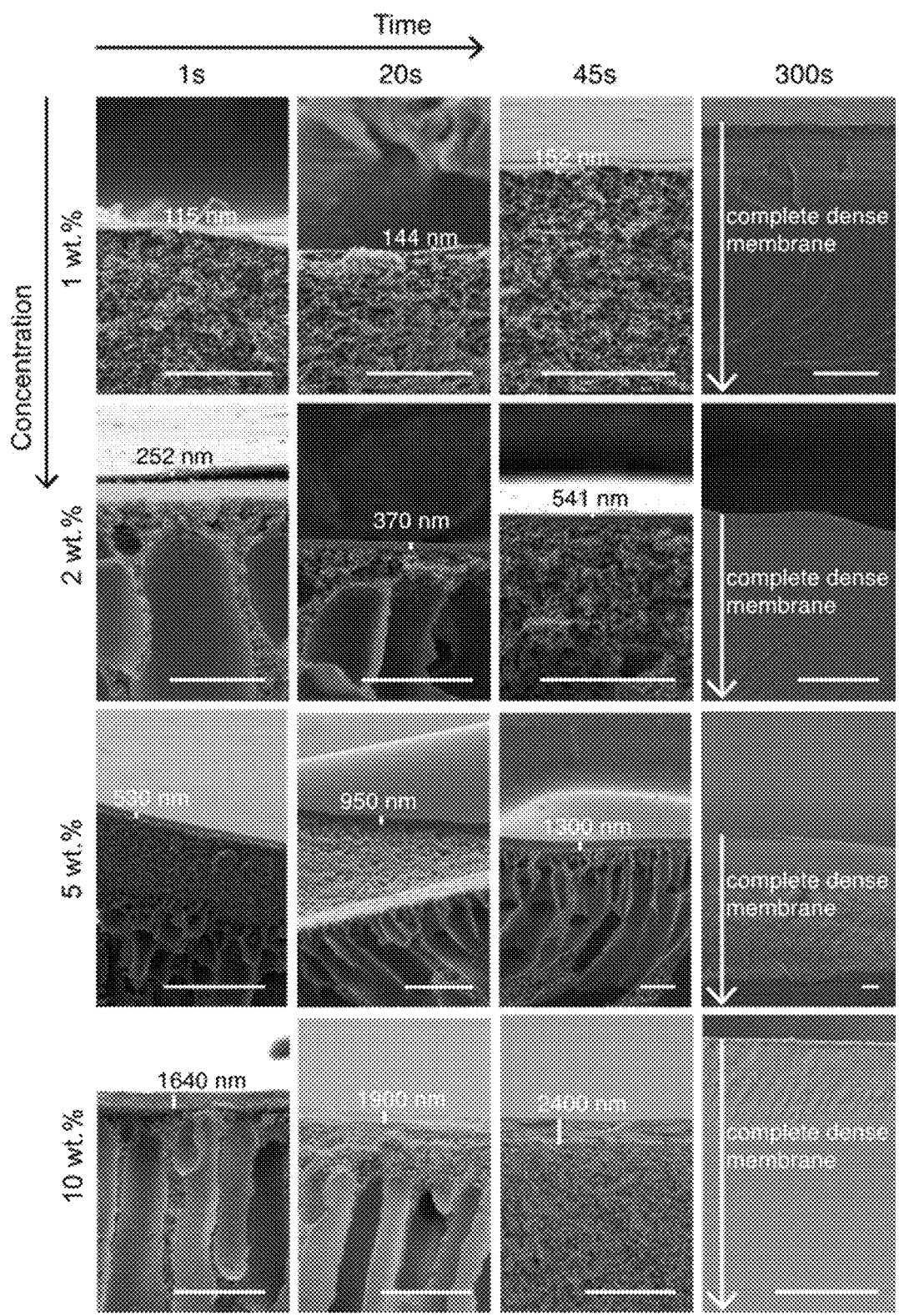
FIG. 6 is a series of SEM images showing the thickness dependence of the membrane dense layer with different immersion times and cross-linker concentrations (scale bars represent 10 µm)

FIG. 6 shows multiple SEC images of membranes formed using DBX crosslinker concentrations of 1 wt %, 2 wt %, 5 wt % and 10 wt % over several immersion times. Immersion times tested were 1, 20, 45 and 300 seconds. It can be seen that as the time increases the thickness of the dense top layer increases. Increasing the DBX crosslinker concentration also increases the thickness of the dense top layer. At the 1, 20 and 45 second time-points for all of the DBX concentrations, a relatively thin dense layer has formed (115 nm-2400 nm) with varying degrees of porosity and macrovoids evident in the porous non-crosslinked support layer on the bottom. At 300 seconds for all of the DBX concentrations tested, a complete dense membrane has formed with no porous support layer visible.

Figure 7:
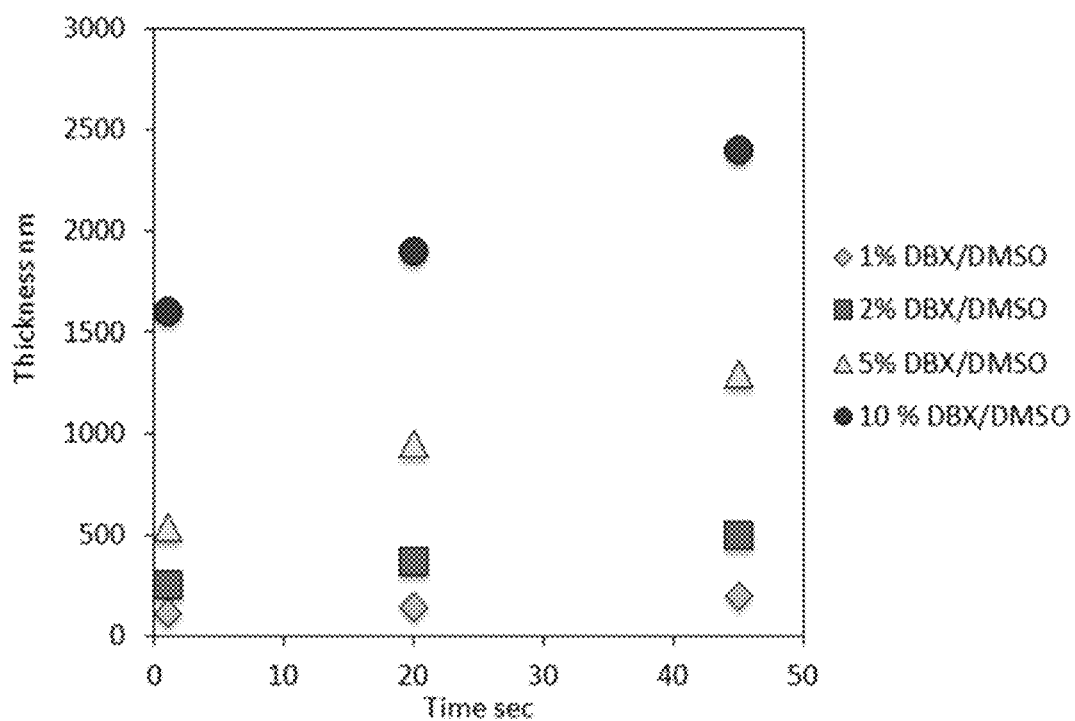
FIG. 7 is a graph showing the thickness of the membrane dense layer as a function of time of immersion for different cross-linker concentrations.

FIG. 7 is a graphical representation of the thickness of the dense top layer seen in the SEC images of FIG. 6 over the 1, 20 and 45 second time points. At 1 wt % DBX, the dense top layer has thicknesses of 115 nm, 144 nm and 152 nm at 1, 20 and 45 seconds, respectively. At 2 wt % DBX, the dense top layer has thicknesses of 252 nm, 370 nm and 541 nm at 1, 20 and 45 seconds, respectively. At 5 wt % DBX, the dense top layer has thicknesses of 530 nm, 950 nm and 1300 nm at 1, 20 and 45 seconds, respectively. And, at 10 wt % DBX, the dense top layer has thicknesses of 1640 nm, 1900 nm and 2400 nm at 1, 20 and 45 seconds, respectively.

Figure 8:
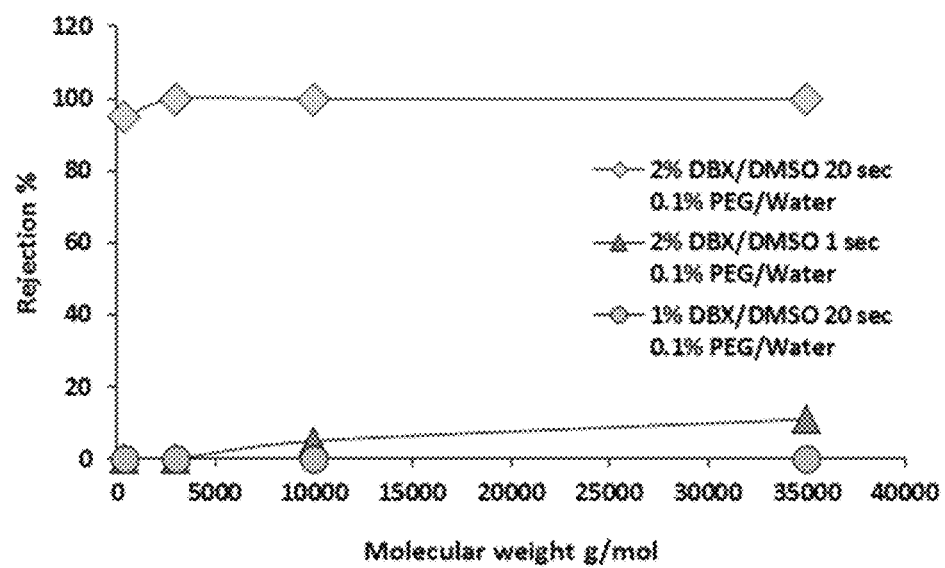
FIG. 8 is a graph showing the rejection performance of polyethylene glycol (PEG) in water for Reaction Induced Phase Separation (RIPS) membranes.

FIG. 8 is a graph showing the rejection of polyethylene glycol (PEG) by the dense top layer of the membranes. Membranes were prepared to test for performance as a filtration media. The rejection test used a 0.1 wt % of 400, 3000, 10000 and 35000 g/mol molecular weight of polyethylene glycol (PEG) in a water solution as filtration markers. This membranes tested were prepared using 1% and 2% concentration of DBX crosslinker for 1 and 20 seconds of immersion time. The membrane performance regarding the increase of time of immersion in crosslinker bath with fixed concentration showed enhancement in the rejection value. The 2% DBX/DMSO for 1 second showed no rejection for any of the molecular weights of PEG while the 2% DBX/DMSO for 20 seconds showed above 90% rejection for 400 g/mol PEG. The effect of concentration of crosslinker for fixed time of immersion illustrated that even for prolonged time (approximately 20 seconds), 1% DBX/DMSO was not enough to form a dense selective layer that rejected above 90% of 400 g/mol PEG.

Example 2. Reaction Induced Phase Separation (RIPS) with Tr-X Crosslinker

Figure 9:
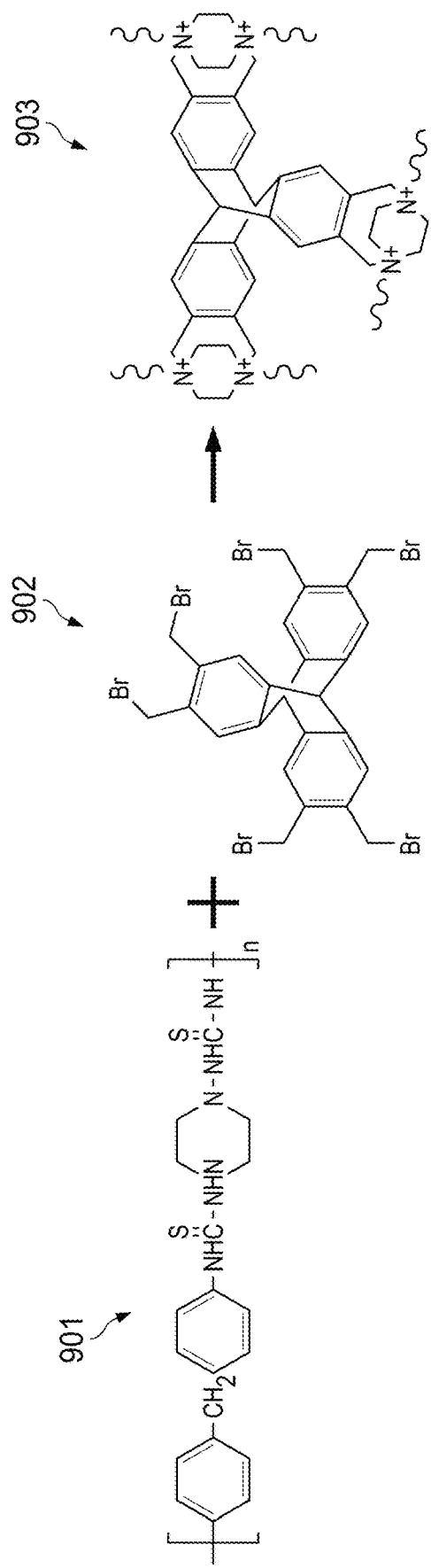
FIG. 9 is a schematic of the herein provided method for Example 2.
Figure 9:
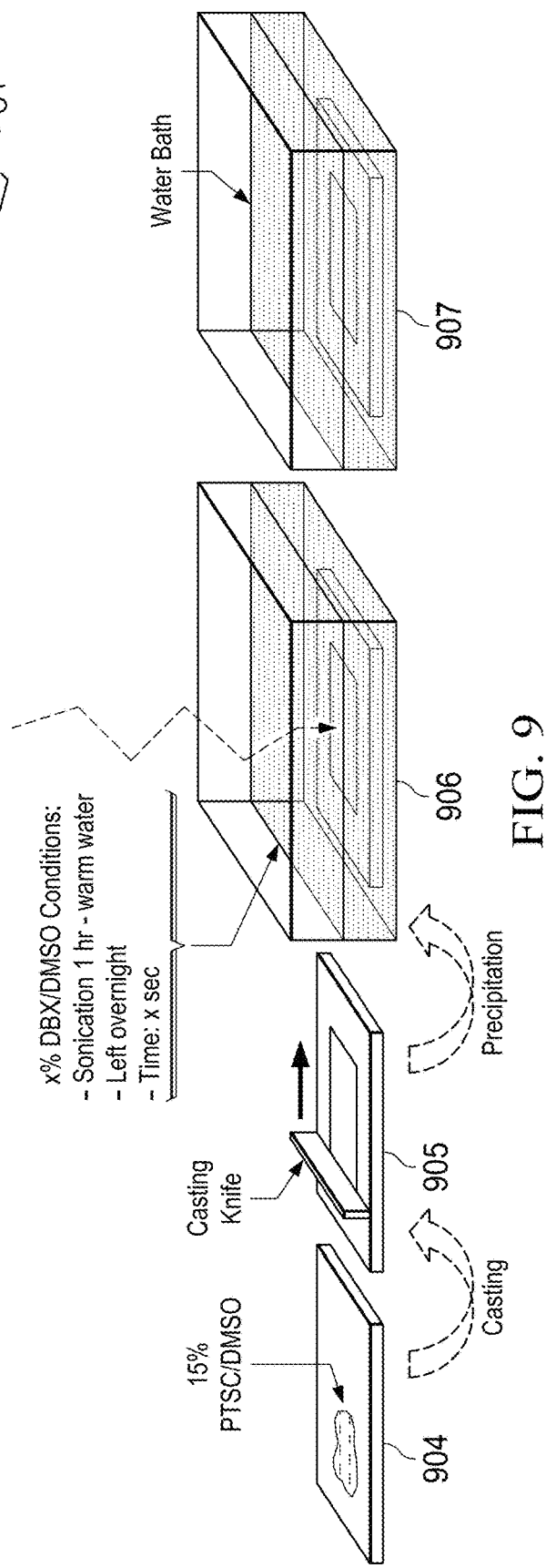

FIG. 9 is a schematic of RIPS fabrication of membranes using a brominated triptycene (Tr-X) (902) crosslinker. In the chemical reaction schematic at the top of Example 2, the PTSC polymer (901) is crosslinked by Tr-X (902) to form a film of crosslinked PTSC polymer (903).

The membranes were prepared using a polymeric solution of 15 wt % PTSC in DMSO as the casting solution. The resulting polymer solution was viscous and yellow in color. To eliminate any air bubbles in the solution, a two-hour settling time was allowed, avoiding possible imperfections in the membrane.

The general preparation process consisted of casting a 250 μm thick polymer solution film with a membrane casting knife by applying the polymer solution to a casting plate (904) and using a casting knife to spread the solution into a thin film (905). Following the casting step, (906) the polymer film is immersed (906) in a 5 weight/weight % solution of brominated triptycene (2,3,6,7,14,15-Hexakis (bromomethyl)-9,10-dihydro-9,10-[1',2'] benzenoanthracene) (Tr-X) in DMSO for different times of immersion to form the dense layer. Finally, the polymeric films were transferred to a non-solvent water bath (907) to precipitate the porous support.

Figure 10:
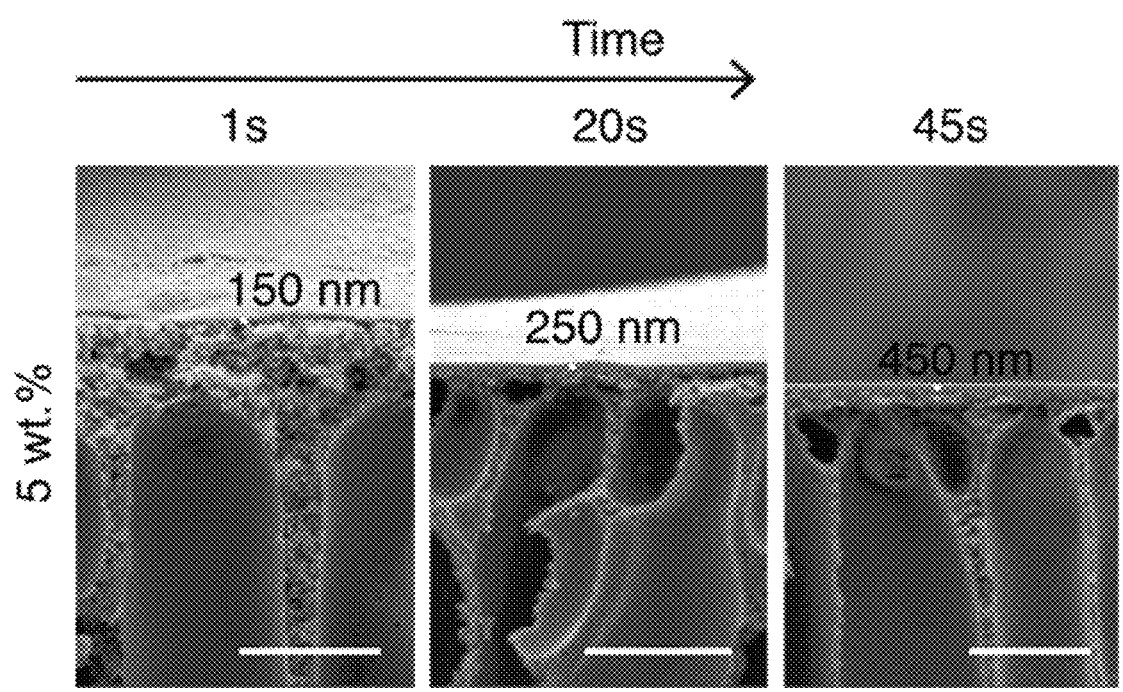
FIG. 10 is a series of SEM images of membrane cross-sections of 15% PTSC/DMSO film precipitated in 5% Tr-X/DMSO for 1, 20 and 45 seconds (scale bars represent 10 µm)

SEM images of 5% Tr-X/DMSO membranes precipitated for 1, 20 and 45 seconds are presented in FIG. 10. With a constant 5 wt % of Tr-X crosslinker, the thickness of the dense layer is seen to increase from 150 nm to 450 nm as the immersion time increases. A non-crosslinked porous support layer having macrovoids is formed below the top dense layer at all three time-points tested.

FIGS. 11, 12A, 12B, and 12C show a summary of the permeance of the membranes prepared by the RIPS method in terms of water permeance for different parameters. Membranes fabricated by the RIPS method with the same crosslinker concentration and same immersion time, but with different crosslinker types were tested for rejection performance for 0.0005% Rose Bengal dye (1017 g/mol) in water. Both membranes showed a 100% rejection, as seen in FIG. 11, with permeance values of 0.06 LMHbar for 5% DBX/DMSO for 20 seconds and 7.7 LMHbar for 5% Tr-X/DMSO for 20 seconds.

In FIG. 12, it is seen that the permeance value decreases with increasing immersion time for a constant 2% concentration of the DBX crosslinker. In FIG. 12B, the permeance value is seen to increase for the same immersion time as the DBX concentration decreases from 2% to 1%. The Tr-X crosslinker is responsible for the increase in permeance value (as seen in FIG. 12C), due to its rigid, bulky open structure that creates extra channels in the polymer matrix.

Some of these membranes were also tested for organic solvent nanofiltration, for example, a 5% Tr-X/DMSO 1 second immersion membrane was tested for dye rejection of 0.0005% Direct red (1373.07 g/mol) in ethanol. The rejection was 100% at a permeance of 7 LMHbar.

A number of embodiments have been described. Nevertheless, it will be understood that various modifications may be made. Accordingly, other embodiments are within the scope of the claims. Disclosed herein are materials, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutations of these compounds may not be explicitly disclosed, each is specifically contemplated and described herein.

For example, if a method is disclosed and discussed and a number of modifications that can be made to a number of molecules including the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. An asymmetric membrane having a first layer and a second layer, produced by the process comprising the steps of:
    (a) preparing a polymeric solution comprising one or more polymers, said preparing step includes a condensation reaction of monomers in a first solvent;
    (b) casting the polymeric solution to form a polymeric film;
    (c) contacting the polymeric film with a second solvent comprising a crosslinker under conditions to form a first layer on a top side of the polymeric film, wherein the crosslinker includes one or more functional groups that are incorporated into the first layer, the first layer is a dense, solvent-resistant first layer including crosslinked polymeric chains, said contacting step includes immersing the polymeric film for an immersion time of more than 0.1 seconds in the second solvent comprising the crosslinker, and said solvent-resistant first layer floats on a remaining part of the polymeric film; and
    (d) contacting the polymeric film having the dense, solvent-resistant first layer with a non-solvent solution under conditions that form, by precipitation of the remaining part of the polymeric film, a porous second layer on the bottom of the polymeric film, the second layer including uncrosslinked polymeric chains and not the one or more functional groups.

2. The product produced by the process of claim 1 wherein the polymeric film is 10 microns to 500 microns in thickness.

3. The product produced by the process of claim 1 wherein said immersion time in step (c) does not extend more than 300 seconds.

4. The product produced by the process of claim 1 wherein the non-solvent solution is water.

5. The product produced by the process of claim 1 wherein the polymeric solution of step (a) further comprises the first solvent and wherein the second solvent of step (c) is the same as the first solvent.

6. The product produced by the process of claim 1 wherein the crosslinker is a bifunctional alkyl halide, a multifunctional alkyl halide, a bifunctional isocyanate, a multifunctional isocyanate a bifunctional acyl chloride, a multifunctional acyl chloride, or any combination thereof.

7. The product produced by the process of claim 1 wherein the crosslinker comprises the formula XRY, where X is the same as Y, and wherein X or Y is I, Br, Cl, F, CN, COCl, C6H4SO3H, or an epoxy group, and wherein R is an aliphatic or aromatic moiety.

8. The product produced by the process of claim 1 wherein the crosslinker comprises the formula X—R—Y, where X is different than Y, and wherein X or Y is I, Br, Cl, F, CN, COCl, C6H4SO3H, or an epoxy group, and wherein R is an aliphatic or aromatic moiety.

9. The product produced by the process of claim 1 wherein the crosslinker is 1,4-dibromo-p-xylene (DBX), 2,3,6,7,14,15-hexakis (bromomethyl)-9,10-dihydro-9,10-[1',2'] benzenoanthracene (Tr-X), or combinations thereof.

10. The product produced by the process of claim 1 wherein the one or more of the functional groups crosslink within one minute or less in the presence of the solvent comprising the crosslinker to form the dense first layer.

11. The product produced by the process of claim 1 wherein the one or more polymers comprise polythiosemicarbazide polymer (PTSC), polybenzimidazole polymer (FBI), or combinations thereof.

12. The product produced by the process of claim 1 wherein the solvent is dimethyl sulfoxide (DMSO), Dimethylacetamide (DMAc), Dimethylformamide (DMF), Tetrahydrofuran (THF), N-methyl-2-pyrrolidone (NMP), or combinations thereof.

13. The product produced by the process of claim 1 wherein the polymeric solution comprises 5-35% (weight/weight) of the polymer.

14. The product produced by the process of claim 1 wherein the crosslinker comprises 0.1-10% (weight/weight) of the solvent comprising the crosslinker.

15. The product produced by the process of claim 1 wherein the solvent comprises DMSO.

16. The product produced by the process of claim 1 wherein the contacting with the non-solvent solution comprises 30 minutes to 24 hours.

17. The product produced by the process of claim 1 wherein the dense first layer is 10 nm to 10 µm in thickness.

18. A method of making a multi-layer asymmetric membrane comprising the steps of:
(a) preparing a polymeric solution comprising one or more polymers, said preparing step includes a condensation reaction of monomers in a first solvent;
(b) casting the polymeric solution to form a polymeric film;
(c) contacting the polymeric film with a second solvent comprising a crosslinker under conditions to form a first layer on a top side of the polymeric film, wherein the crosslinker includes one or more functional groups that are incorporated into the first layer, the first layer is a dense, solvent-resistant first layer including crosslinked polymeric chains, said contacting step includes immersing the polymeric film for an immersion time of more than 0.1 seconds in the second solvent comprising the crosslinker and said solvent-resistant first layer floats on a remaining part of the polymeric film; and
(d) contacting the polymeric film, having the dense, solvent-resistant first layer, with a non-solvent solution under conditions that form, by precipitation of the remaining part of the polymeric film, a porous second layer on the bottom of the polymeric film, the second layer including uncrosslinked polymeric chains and not the one or more functional groups.

19. The method of claim 18, wherein the polymeric film is 10 microns to 500 microns in thickness.

20. The method of claim 18, wherein said immersion time in step (c) does not extend more than 300 seconds.

21. The method of claim 18, wherein the non-solvent solution is water.

22. The method of claim 18, wherein the polymeric solution of step (a) further comprises the first solvent and wherein the second solvent of step (c) is the same as the first solvent.

23. The method of claim 18, wherein the crosslinker is a bifunctional alkyl halide, a multifunctional alkyl halide, a bifunctional isocyanate, a multifunctional isocyanate a bifunctional acyl chloride, a multifunctional acyl chloride, or any combination thereof.

24. The method of claim 18, wherein the crosslinker comprises the formula X—R—Y, where X is the same as Y, and wherein X or Y is I, Br, Cl, F, CN, COCl, C6H4SO3H, or an epoxy group, and wherein R is an aliphatic or aromatic moiety.

25. The method of claim 18, wherein the crosslinker comprises the formula X—R—Y, where X is different than Y, and wherein X or Y is I, Br, Cl, F, CN, COCl, C6H4SO3H, or an epoxy group, and wherein R is an aliphatic or aromatic moiety.

26. The method of claim 18, wherein the crosslinker is 1,4-dibromo-p-xylene (DBX), 2,3,6,7,14,15-hexakis (bromomethyl)-9,10-dihydro-9,10-[1',2'] benzenoanthracene (Tr-X), or combinations thereof.

27. The method of claim 18, wherein the one or more of the functional groups crosslink within one minute or less in the presence of the solvent comprising the crosslinker to form the dense first layer.

28. The method of claim 18, wherein the one or more polymers comprise polythiosemicarbazide polymer (PTSC), polybenzimidazole polymer (FBI), or combinations thereof.

29. The method of claim 18, wherein the solvent is dimethyl sulfoxide (DMSO), Dimethylacetamide (DMAc), Dimethylformamide (DMF), Tetrahydrofuran (THF), N-methyl-2-pyrrolidone (NMP), or combinations thereof.

30. The method of claim 18, wherein the polymeric solution comprises 5-35% (weight/weight) of the polymer.

31. The method of claim 18, wherein the crosslinker comprises 0.1-10% (weight/weight) of the solvent comprising the crosslinker.

32. The method of claim 18, wherein the solvent comprises DMSO.

33. The method of claim 18, wherein the contacting with the non-solvent solution comprises 30 minutes to 24 hours.

34. The method of claim 18, wherein the dense first layer is 10 nm to 10 µm in thickness.

35. A method of making a multi-layer asymmetric membrane comprising the steps of:
(a) preparing a polymeric solution comprising one or more polymers, said preparing step includes a condensation reaction of monomers in a first solvent;

(b) casting the polymeric solution to form a polymeric film being between 10 microns to 500 microns in thickness;
(c) contacting the polymeric film with a second solvent comprising a crosslinker under conditions to form a first layer on a top side of the polymeric film, wherein the crosslinker includes one or more functional groups that are incorporated into the first layer, the first layer is a dense, solvent-resistant first layer including cross-linked polymeric chains, said contacting step includes immersing the polymeric film for an immersion time of between 0.1 to 300 seconds in the second solvent comprising the crosslinker, and said solvent-resistant first layer floats on a remaining part of the polymeric film; and
(d) contacting the polymeric film having the dense, solvent-resistant first layer with a non-solvent aqueous solution under conditions that form, by precipitation of the remaining part of the polymeric film, a porous second layer on the bottom of the polymeric film, the second layer including uncrosslinked polymeric chains and not the one or more functional groups.

36. The method of claim 18, wherein the crosslinker is a bifunctional alkyl halide, a multifunctional alkyl halide, a bifunctional isocyanate, a multifunctional isocyanate a bifunctional acyl chloride, a multifunctional acyl chloride, or any combination thereof.

37. The method of claim 18, wherein the crosslinker comprises the formula X—R—Y, where X is the same as Y, and wherein X or Y is I, Br, Cl, F, CN, COCl, C6H4SO3H, or an epoxy group, and wherein R is an aliphatic or aromatic moiety.

38. The method of claim 18, wherein the crosslinker comprises the formula X—R—Y, where X is different than Y, and wherein X or Y is I, Br, Cl, F, CN, COCl, C6H4SO3H, or an epoxy group, and wherein R is an aliphatic or aromatic moiety.

39. The method of claim 18, wherein the crosslinker is 1,4-dibromo-p-xylene (DBX), 2,3,6,7,14,15-hexakis (bromomethyl)-9,10-dihydro-9,10-[1',2'] benzenoanthracene (Tr-X), or combinations thereof.

40. The method of claim 18, wherein the one or more of the functional groups crosslink within one minute or less in the presence of the solvent comprising the crosslinker to form the dense first layer.

41. The method of claim 18, wherein the one or more polymers comprise polythiosemicarbazide polymer (PTSC), polybenzimidazole polymer (FBI), or combinations thereof.

42. The method of claim 18, wherein the first or second solvent is dimethyl sulfoxide (DMSO), Dimethylacetamide (DMAc), Dimethylformamide (DMF), Tetrahydrofuran (THF), N-methyl-2-pyrrolidone (NMP), or combinations thereof.

43. The method of claim 18, wherein the polymeric solution comprises 5-35% (weight/weight) of the polymer.

44. The method of claim 18, wherein the crosslinker comprises 0.1-10% (weight/weight) of the solvent comprising the crosslinker.

45. The method of claim 18, wherein the first or second solvent comprises DMSO.

46. The method of claim 18, wherein the contacting with the non-solvent solution comprises 30 minutes to 24 hours.

* * * * *